United States Patent [19]

Yeakey

[11] 4,220,435
[45] Sep. 2, 1980

[54] UNLOADER FOR RING-SHAPED PALLETS

[75] Inventor: Richard D. Yeakey, Sterling Heights, Mich.

[73] Assignee: F. Jos. Lamb Company, Warren, Mich.

[21] Appl. No.: 935,650

[22] Filed: Aug. 21, 1978

[51] Int. Cl.² .................. B65B 69/00; B65G 11/08
[52] U.S. Cl. ........................... 414/418; 193/47; 198/472; 414/754; 414/780; 414/782
[58] Field of Search ............... 414/418, 403, 425, 224, 414/222, 780-782, 754, 102; 193/47, 44; 198/406, 472, 473, 339

[56] References Cited

U.S. PATENT DOCUMENTS

| 456,336 | 7/1891 | Paris | 414/418 X |
|---|---|---|---|
| 1,636,235 | 7/1927 | Knowles | 193/47 X |
| 3,645,369 | 2/1972 | Rebane et al. | 193/47 |
| 3,920,129 | 11/1975 | le Vasseur | 198/339 X |

Primary Examiner—Stephen G. Kunin
Assistant Examiner—Edmond G. Rishell, Jr.
Attorney, Agent, or Firm—Barnes, Kisselle, Raisch & Choate

[57] ABSTRACT

A workpiece having an enlarged head and a stem extending therefrom is conveyed in a gravity chute while supported vertically in a ring-shaped pallet with the head supported on the top side of the pallet and the stem extending downwardly through the pallet. The pallet and workpiece are then directed through a downwardly curved orienting chute and come to rest on stop surfaces wherein the workpiece is inclined downwardly, its head foremost, and the axis of the pallet is horizontal. In this position the workpiece is centered with respect to the aperture in the pallet so that the workpiece slides downwardly out of the pallet through an unloading chute. At the lower end of the unloading chute the workpiece falls through a contoured aperture into a downwardly inclined delivery chute which extends in the direction opposite to the unloading chute.

11 Claims, 7 Drawing Figures

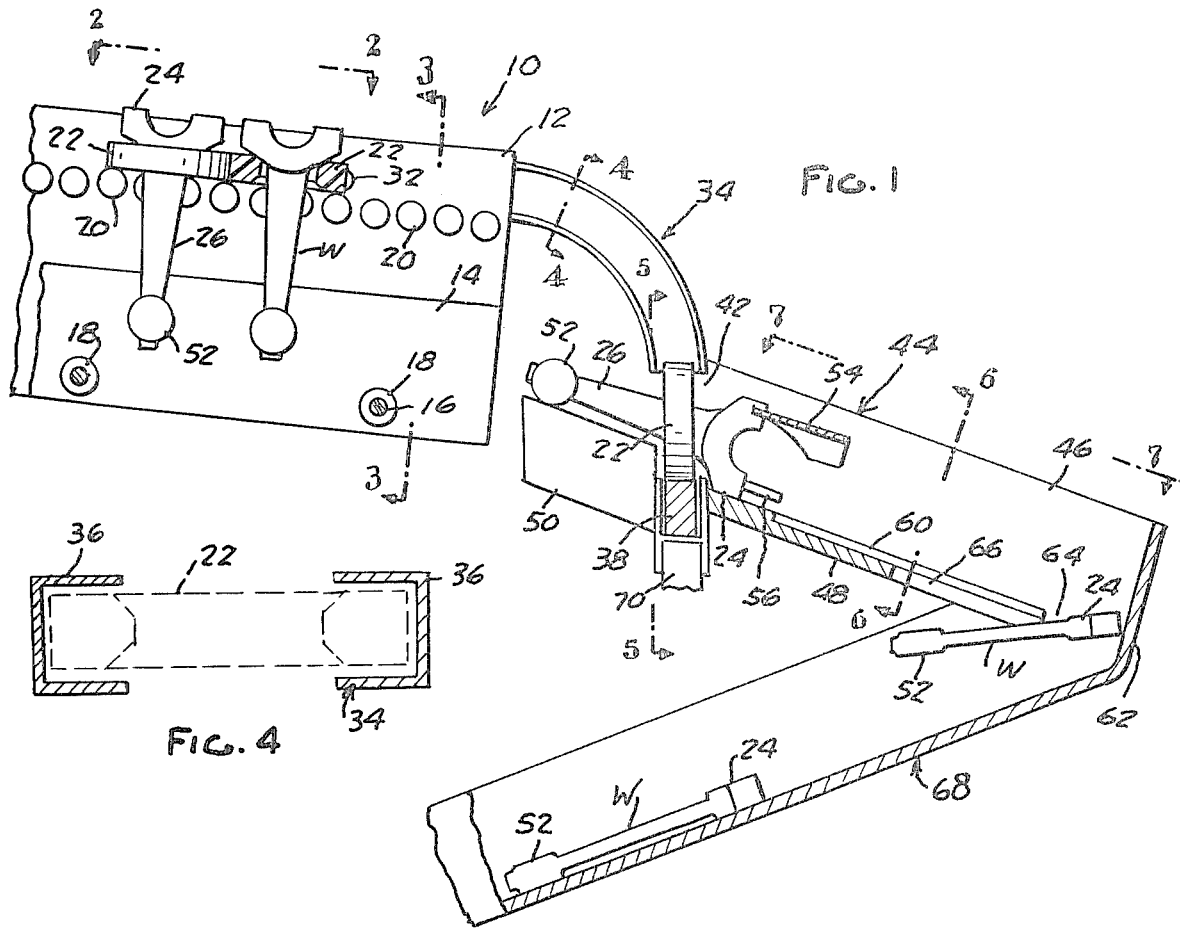
Fig. 1
Fig. 4
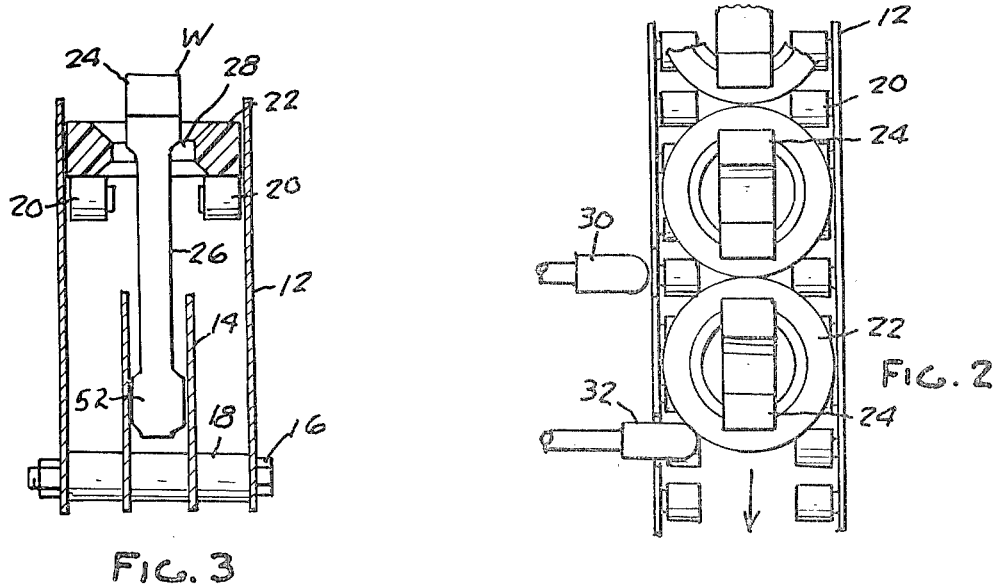
Fig. 3
Fig. 2

UNLOADER FOR RING-SHAPED PALLETS

This invention relates to an apparatus for conveying pallet-supported workpieces and for unloading the workpieces from the pallets.

BACKGROUND OF THE INVENTION

Many workpieces when conveyed between manufacturing operations must be handled individually. This is particularly true when workpieces have been partially or wholly processed and cannot withstand rough handling, such as where contact of a machined surface of the workpiece with another workpiece may cause damage to the finished surface or damage that is detrimental to further processing. Frequently workpieces lack sufficient flat surfaces as to enable them to be conveyed on rollers. Likewise, the profile of some workpieces causes them to interlock with one another when conveyed end to end and, thus, prevents them from travelling freely in a conveyor system. However, some workpieces, such as piston rods, have a stem portion with an enlarged head at one end thereof which renders them admirably suited to be conveyed by means of a ring-shaped pallet with the enlarged head supported on its underside by the pallets and the stem portion of the workpiece extending downwardly through the pallets.

1. Field of the Invention

The present invention relates specifically to the conveying of such workpieces having an enlarged head and a stem and utilizes a flat, ring-shaped pallet on which the workpieces can be carried individually.

More specifically, the present invention is concerned with conveying such pallet-supported workpieces in gravity chuting for transporting the workpieces along a downwardly inclined path from station to station. At the work performing stations the workpieces are automatically removed from the successive pallets by an unloading mechanism so that the required manufacturing operation can be performed on the workpiece. The empty pallet then travels downstream and joins other empty pallets that are waiting at a downstream station to receive the workpieces after the desired operation on them has been completed.

2. Description of Prior Art

In the past many attempts have been made to solve the problem of unloading the workpiece from the ring-shaped pallet when utilizing a conveying system of the type described. None of these efforts have been entirely satisfactory. When an industrial robot, such as a mechanical hand, is employed to remove the workpieces from the pallet, the initial cost of the mechanism is excessively high and the robot controls, working in the environment in close proximity to the manufacturing machines, prove to be extremely unreliable. Cam and pneumatic operated unloaders likewise have the disadvantage of being relatively expensive and complicated.

SUMMARY OF THE INVENTION

The present invention comprises a simple, inexpensive and reliable mechanism that is easily maintained and operated entirely by the gravitational forces on the workpiece and pallet. The ring-shaped pallets carrying the workpieces and travelling downwardly in an inclined gravity chuting are arrested by an escapement mechanism which meters the loaded pallets one at a time as they exit from the gravity chuting. The pallets with the workpieces supported thereon then traverse a short section of an arcuate, downwardly curving track that changes the orientation of the pallet from a generally horizontal position to a generally vertical position (the axis of the pallet rotates from vertical to horizontal orientation) and changes the orientation of the workpiece from a generally vertical position to a downwardly inclined position. The downward movement of the vertically oriented pallet is arrested by means of a retractible stop and the downward movement of the workpiece is arrested by a downwardly inclined stop surface which substantially centers the workpiece in the hole of the ring-shaped pallet so that it is free to slide downwardly out of the pallet under the influence of gravity. In this sliding mode the workpiece has its enlarged head foremost and, as it slides downwardly in the unloading chute, its forward progress will be stopped by a barrier. The unloading chute has a contoured opening therein through which the workpiece will fall when it engages the barrier and drops into a second oppositely inclined gravity chute. Thus, the workpiece will then have its small end foremost which is usually required in the next manufacturing machine. The stop on which the ring-shaped pallet rests is retractible to enable the pallet to roll downwardly on its outer periphery to the next loading station.

It is an object of this invention to provide a simple and reliable mechanism for conveying workpieces on and for unloading workpieces from ring-shaped pallets.

A further object of the present invention is to provide a mechanism for reorienting a workpiece from a vertically disposed to a generally horizontally disposed position.

Another object of the invention is to provide a simple mechanism which is operated solely by gravity for reorienting a workpiece and for unloading it from a ring-shaped pallet.

BRIEF DESCRIPTION OF THE DRAWINGS

Further objects, features and advantages of the present invention will become apparent from the following description and accompanying drawings, in which:

FIG. 1 is a sectional view through the unloader and orienter mechanism of the present invention;

FIG. 2 is a fragmentary plan view along the line 2—2 in FIG. 1;

FIG. 3 is a sectional view along the line 3—3 in FIG. 1;

FIG. 4 is a sectional view along the line 4—4 in FIG. 1;

DESCRIPTION OF PREFERRED EMBODIMENT

Figure 5:
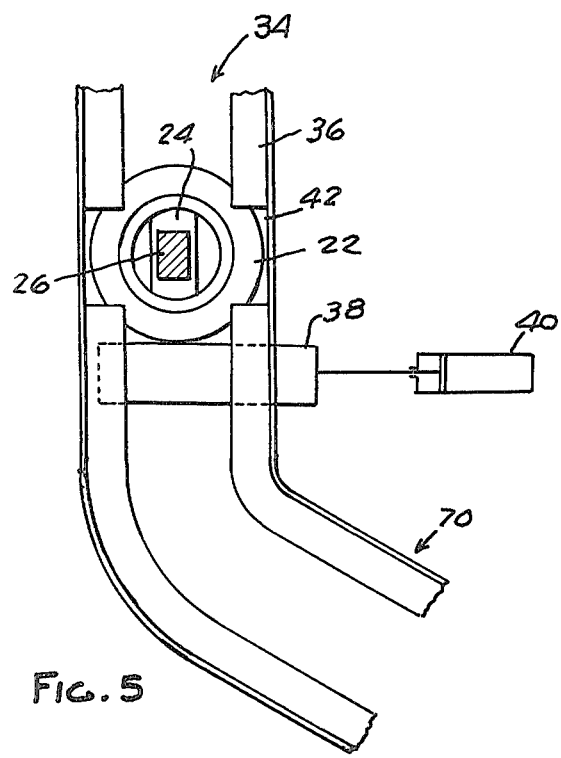
FIG. 5 is a sectional view along the line 5—5 in FIG. 1.

In FIG. 1 a section of a conventional gravity roller conveyor is shown generally at 10. Conveyor 10 has a pair of laterally spaced side rails 12 and guide rails 14 which are connected in laterally spaced relation as shown in FIG. 3 by screws 16 and spacer bushings 18. A series of rollers 20 are mounted on each side rail 12 for supporting ring-shaped pallets 22. In the embodiment illustrated the workpieces W are in the form of piston rods having an enlarged head 24 and a depending stem 26. Pallets 22 are formed of plastic or a hard rubber with a central opening 28 so that the workpieces W can be supported thereby with the underside of head 24 resting on the top side of the pallet and the stem 26 extending downwardly through the central opening 28 in the pallet. Conveyor 10 with its rollers 20 is inclined slightly downwardly so that the pallet-supported workpieces will gravitate toward the lower end of the conveyor. Adjacent the lower end of the conveyor there is arranged an escapement for arresting the movement of the pallets and for releasing them one at a time. In the embodiment illustrated the escapement mechanism is of a conventional type and comprises a pair of plungers 30, 32 which are actuated by cylinders (not illustrated) to alternately extend into the path of pallets 22 and allow them to proceed downstream one at a time in a conventional manner.

An arcuate orienting chute 34 extends downwardly from the lower end of conveyor 10. Chute 34 preferably comprises a pair of laterally spaced, U-shaped guide rails 36 which form a guide track for pallets 22. The lower end of chute 34 extends generally vertically and is traversed by a retractable stop 38 operated by a cylinder 40. Stop 38 is positioned to arrest the downward movement of each pallet 22 in the position shown in FIG. 1. An opening 42 (FIG. 5) adjacent the lower end of chute 34 and on the front side thereof provides an inlet to an unloading chute 44 having side walls 46 and a bottom plate 48. On the side of chute 34 directly opposite unloading chute 44 there is arranged a block 50 which cooperates with the bottom wall 48 of chute 44 to arrest the downward movement of the workpiece in the inclined position shown in FIG. 1. In this position the head 24 of the workpiece is resting on the bottom plate 48 and the boss 52 at the opposite end of stem 26 is resting on the top surface of block 50. Bottom plate 48 and block 50 are positioned relative to the retractable stop 38 so that when a pallet 22 comes to rest on stop 38 the workpiece is inclined downwardly in a position generally central relative to the opening 28 in pallet 22. Bottom plate 48 and the top supporting face of block 50 are inclined sufficiently to permit the workpiece to slide downwardly out of engagement with the ring-shaped pallets under the influence of gravity.

Figure 6:
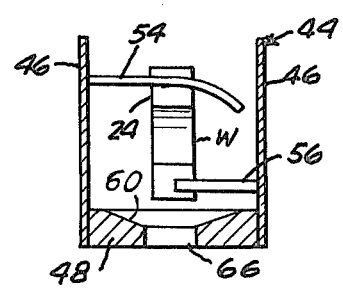
FIG. 6 is a sectional view along the line 6—6 in FIG. 1.
Figure 7:
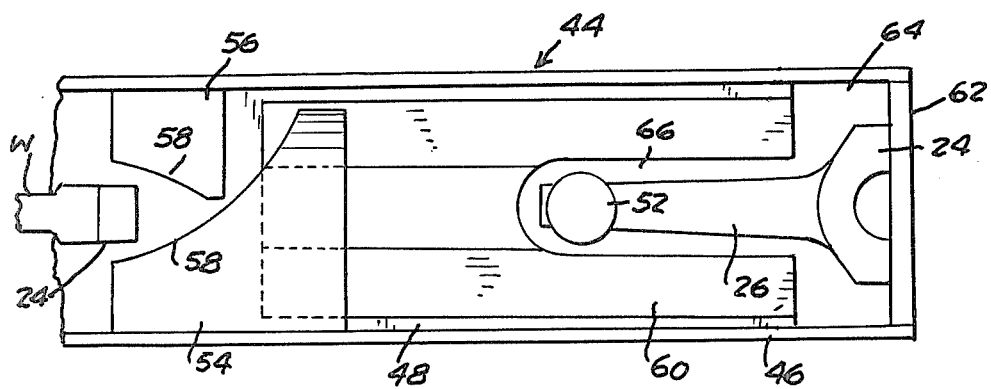
FIG. 7 is a plan view along the line 7—7 in FIG. 1.

It will be observed that in conveyor 10 the workpieces are arranged on the pallet 22 with the longer dimension of the heads 24 extending lengthwise of the conveyor. Thus, when the workpieces come to rest at the lower end of chute 34 they are oriented with the longer dimention of the head extending in a generally vertical plane. To facilitate the further conveyance of the workpieces by gravity it is desirable to rotate them axially through 90° as they slide downwardly through chute 44. The means for rotating the workpieces comprises a pair of cam plates 54, 56. As shown in FIGS. 6 and 7, cam plates 54, 56 are spaced apart vertically and are mounted one on each of the opposite side walls 46 of unloading chute 44. Each cam plate is provided with an arcuate work-engaging edge 58. Cam plates 54, 56 are arranged such that when engaged by the leading end of head 24 of the workpiece the workpiece is rotated 90° about its longitudinal axis so that it will lie flat on the upper supporting surface 60 of support plate 48.

Referring now to FIG. 7, it will be observed that support plate 48 terminates short of wall 62 at the lower end of unloading chute 44. An opening 64 is thereby provided adjacent the lower end of chute 44 which is sufficiently large to accommodate the head 24 of the workpiece. Support plate 48 is provided with a slot 66 extending lengthwise from generally the mid section thereof to the lower end thereof. Opening 64 and slot 66 are dimensioned and arranged so that as the workpiece slides to the lower end of chute 44 the head 24 will drop downwardly through opening 64 and the stem 26 will simultaneously fall through the slot 66.

Opening 64 and slot 66 communicate with the downwardly inclined delivery chute 68 which extends in a direction opposite to the unloading chute 44. Thus, as the workpieces slide down the support surface 60 of plate 48 head end foremost they drop down into delivery chute 68 and slide downwardly therein with their stem ends foremost. An appropriate mechanism is provided at the lower end of delivery chute 68 for loading the workpieces into the machine for the next operation.

In operation, when the manufacturing machine that the above described mechanism is serving signals for a workpiece, plunger 30 advances into the path of pallets 22 to restrain the pallets upstream therefrom and plunger 32 retracts to release the leading pallet in the line. Thus the leading pallet and the workpiece supported thereby are advanced, traverse chute 34 and the pallet comes to rest on stop 38. As previously pointed out and as shown in FIG. 1, when pallet 22 engages stop 38 it is disposed in a generally vertical position and the workpiece comes to rest on the top face of block 50 and the top face 60 of plate 48 in a downwardly inclined position with the head 24 foremost. In this position the workpiece is substantially centered with respect to the central opening 28 in pallet 22 and is sufficiently inclined so that it will slide downwardly into chute 44. When the workpiece slides downwardly its head 24 at the leading end thereof engages edges 58 of cams 56, 54 so as to rotate the workpiece 90° about its longitudinal axis. As soon as the tail end of the workpiece clears pallet 22 stop 38 will be retracted by cylinder 40 to release pallet 22 and permit the pallet to roll downwardly through the storage track 70 to a pallet loading station (not shown). When the workpiece advances to the lower end of unloading chute 44 it drops through opening 64 and slot 66 and then slides downwardly through delivery chute 68 to the machine which performs the next operation on the workpiece.

I claim:

1. A gravity chuting assembly for conveying pallet-supported workpieces and for unloading the workpieces from the pallets, said workpieces being axially elongated and having an enlarged head at one end and an elongated stem projecting axially from said head, said pallet having a transverse dimension larger than the transverse dimension of the head and a central aperture therein having a transverse dimension larger than the transverse dimension of the stem and smaller than the transverse dimension of said head so that the workpiece is adapted to be supported on a horizontally disposed pallet with its axis disposed vertically and with the underside of the head engaging the top face of the pallet and the stem extending vertically downwardly through the central aperture in the pallet, comprising, a gravity chute through which the vertically oriented pallet-supported workpieces are adapted to be conveyed by gravity, a downwardly curved orienting chute extending from the lower end of said gravity chute and through which the pallet-supported workpieces are adapted to gravitate, said orienting chute extending in a generally vertically downward direction at its lower end, said orienting chute having guide means, thereon engageable with the pallets for re-orienting them from a generally horizontally disposed position as they exit from said gravity chute to a generally vertically disposed position, stop means adjacent the lower end of said orienting chute for arresting movement of the pallet in said vertical position, stop means adjacent the lower end of said orienting chute for arresting downward movement of the pallet-supported workpiece in a position inclined downwardly with its head foremost, said workpiece stop means forming a workpiece support surface which is inclined downwardly sufficiently to cause the workpiece to slide forwardly in a downward direction and thus cause the stem to slide out of the central aperture of the vertically disposed pallet.

2. The assembly called for in claim 1 wherein said guide means comprises two guide rails each having upper and lower flanges thereon spaced apart a distance slightly greater than the thickness of said pallet, the upper flanges of the two rails being spaced apart laterally to accommodate the head and the lower flanges of the two rails being spaced apart laterally to accommodate the stem of the workpiece therebetween.

3. The assembly called for in claim 2 wherein the flanges of one rail are spaced laterally from the flanges of the other rail a distance less than the transverse dimension of said pallet.

4. The assembly called for in claim 1 including a second gravity chute at the lower end of said orienting chute for conveying the pallets after they have been unloaded, said pallet stop means being located at the junction of said orienting chute and said second gravity chute and including means for retracting said pallet stop means to permit the pallet to gravitate through the second gravity chute.

5. The assembly called for in claim 4 wherein said pallet comprises a generally circular disc and said second gravity chute is adapted to support the pallet for rolling movement therein.

6. The assembly called for in claim 5 wherein the first gravity chute includes a series of generally horizontally disposed rollers by means of which the pallet is adapted to be conveyed by gravity when disposed in said generally horizontal position.

7. The assembly called for in claim 1 wherein said support surface forms a portion of a downwardly inclined workpiece unloading chute, said unloading chute having an abutment at the lower end thereof spaced from the lower end of said support surface a distance at least slightly greater than the axial dimension of said head, said support surface having a slot therein narrower than said transverse dimension of said head and wider than said transverse dimension of said stem, said slot extending to the lower end of said support surface so that as the workpiece slides down the support surface the stem drops downwardly through said slot and the head drops downwardly through the space between said abutment and the end of said support surface and a discharge chute inclined downwardly from the lower end of said unloading chute and extending generally in the opposite direction whereby the unloaded workpieces gravitate in a downwardly inclined direction along said discharge chute with the stem end thereof foremost.

8. The assembly called for in claim 7 wherein said support surface comprises two sections located on opposite sides of said pallet stop means so that when the pallet is engaged by its stop means the head of the workpiece is supported on one of said sections and the stem of the workpiece is supported on the other section.

9. The assembly called for in claim 8 wherein both sections of said support surface are inclined downwardly at generally the same angle.

10. The assembly called for in claim 7 wherein the head of the workpiece has a thickness dimension perpendicular to and substantially less than its transverse dimension and including means in said unloading chute adapted to engage therein the head of a workpiece oriented such that its transverse dimension extends vertically and to then rotate the workpiece about its longitudinal axis through an angle of 90° to a position wherein the transverse dimension of the head of the workpiece extends generally horizontally.

11. The assembly called for in claim 10 wherein said engaging and rotating means comprises a pair of vertically spaced cams in said unloading chute having oppositely inclined workpiece engaging edges for engaging and displacing the upper and lower portion of the vertically disposed head in opposite directions.

* * * * *